United States Patent [19]
Vaishnavi et al.

[11] Patent Number: 5,590,120
[45] Date of Patent: Dec. 31, 1996

[54] PORT-LINK CONFIGURATION TRACKING METHOD AND APPARATUS

[75] Inventors: Vick Vaishnavi, Danville; Wallace Matthews, Northwood; Patrick Kenny, Dover, all of N.H.

[73] Assignee: Cabletron Systems, Inc., Rochester, N.H.

[21] Appl. No.: 550,630

[22] Filed: Oct. 31, 1995

[51] Int. Cl.$^6$ .............................. H04J 3/14; H04L 12/26
[52] U.S. Cl. ...................... 370/254; 370/252; 395/200.11
[58] Field of Search .................................. 370/13, 16, 17, 370/53, 60, 60.1, 79, 94.1, 94.2, 94.3, 110.1; 395/200.1, 200.2, 200.10, 200.11, 200.12, 183.01, 183.04, 184.01, 185.01

[56] References Cited

U.S. PATENT DOCUMENTS

| | | | |
|---|---|---|---|
| 4,513,411 | 4/1985 | Fraser | 370/13 |
| 4,817,080 | 3/1989 | Soha | 370/17 |
| 5,319,633 | 6/1994 | Geye et al. | 370/17 |
| 5,471,399 | 11/1995 | Tanaka et al. | 370/13 |
| 5,481,674 | 1/1996 | Mahavadi | 395/200.11 |
| 5,513,171 | 4/1996 | Ludwiczak et al. | 370/13 |

*Primary Examiner*—Hassan Kizou
*Attorney, Agent, or Firm*—Wolf, Greenfield & Sacks, P.C.

[57] ABSTRACT

A logical representation of a communications network topology has links which represent connections within a network, and models of ports representing elements of devices which form the connections of the network. The logical representation is created and maintained in response to reports from the network, such as new neighbor reports and lost neighbor reports. A new neighbor module creates or changes the logical representation in response to new neighbor reports, based upon whether the reporting port is recently attached and whether the new neighbor port is recently attached. A lost neighbor module changes the logical representation in response to lost neighbor reports, by creating pseudo new neighbor reports, and allowing the pseudo new neighbor reports to be processed following a certain amount of time. The operation of the new neighbor module and lost neighbor module allow reports to be processed independent of the order in which the reports are received, and also facilitates monitoring of complex network topologies, such as those including connections of more than two nodes, and those in which reports may be received in any order.

35 Claims, 11 Drawing Sheets

PORT-LINK CONFIGURATION TRACKING METHOD AND APPARATUS

BACKGROUND OF THE INVENTION

1. Field of the Invention

This invention relates generally to communications networks, and more particularly to monitoring and tracking port-to-link configurations within connection-oriented communications networks.

2. Discussion of the Related Art

Communications networks provide a capability for one device, referred to as a source, to transmit data to another device, referred to as a destination. Among the conventional types of communications are connection-oriented communications and connectionless communications.

In connection-oriented communications, a logical association is established between the source and the destination, so that several separate groups of data may be sent along the same path that is defined by the logical association. This is distinguished from connectionless communications, in which the source transmits data to the destination in an unplanned fashion and without prior coordination. In connectionless communications, each frame of data is transmitted from the source to the destination in a manner independent from the manner in which other frames are transmitted from the source to the destination. Bridges and routers are commonly used in connectionless communications.

Three phases generally occur during connection-oriented communications, including connection establishment, data transfer, and connection termination. These three phases together are commonly called a session, which may be monitored and controlled by a central authority. In the connection establishment phase, the first time a source has data to be sent to a destination, a logical association, also called the connection or a path, is established between the source and the destination. The connection defines elements and connections between the elements, for example, switches between the source and the destination, and the ports of the switches through which the data will pass from the source to the destination.

A switch, and other devices similar in operation to a switch, may be referred to as a node, intermediate system, interface message processor, or gateway. A port is an interface on a switch or similar device that provides a physical communication path to other devices, for example to other ports of other switches. During the data transfer phase, data is transmitted from the source to the destination along the connection, which includes the port-to-port connections of the switches. After a certain amount of time, or at the occurrence of a certain event, the session enters the connection termination phase, in which the connection is terminated, and the elements which made up the connection are freed to support other connections.

There may be a large number of connections which represents a very large and complex amount of connection information for a central authority to monitor. Additionally, some connections may fail, due to electrical problems or physical or logical removal of any of the elements which make up the connection. For example, a switch may be removed for maintenance or to achieve a more advantageous physical arrangement for other connections. It would thus be desirable to provide a monitoring capability for tracking a large number of connections in a connection-oriented communications network.

SUMMARY OF THE INVENTION

According to several aspects of the present invention, a topology manager is provided that allows "network reports" to be processed independent of the order in which the reports are received, and also facilitates monitoring of complex network topologies, such as those including connections of more than two nodes. The topology manager includes a network representation that is a virtual model of the network topology and which is modified based upon "new neighbor reports" and "lost neighbor reports" received from the network being monitored. New neighbor reports are processed based upon whether the relevant ports of the new neighbor report are recently attached or not recently attached, so that stale or otherwise faulty reports are correctly processed. Lost neighbor reports are processed by creating pseudo new neighbor reports to be processed as actual new neighbor reports at a later time, so that the network configuration may settle prior to fully processing the reports.

In one embodiment, a method is provided for tracking a configuration of a plurality of ports of a communications network. The method comprises the steps of receiving a report which includes an indication that a reporting port has a connection to a neighbor port, determining whether the reporting port has been recently attached to any connection within the communications network, determining whether the neighbor port has been recently attached to any connection within the communications network, and determining the configuration of the plurality of ports based upon based upon whether the reporting port has been recently attached and whether the neighbor port has been recently attached. The step of determining whether either of the ports has been recently attached may include determining whether the port has been attached to a connection for a predetermined amount of time prior to the step of receiving. The method may include creating a network representation that is a virtual model of the configuration of the communications network.

The method may further include steps of receiving a second report which includes an indication that a second reporting port has lost a connection to a lost neighbor port, and the step of determining a configuration may include the steps of creating at least one pseudo new neighbor report, and processing the at least one pseudo new neighbor report to determine the configuration of the plurality of ports. The lost neighbor port and the second reporting port may be part of (connected to) a connection that includes other associated ports, and the method may include creating a pseudo new neighbor report for each of the other associated ports, the pseudo new neighbor report including the lost neighbor port as a pseudo reporting port and the each of the other associated ports as a pseudo new neighbor port. The method may further comprise the step of determining the validity of the second report by determining whether a model of the second reporting port and a model of the lost neighbor port currently share a same link within the network representation, and whether the model of the lost neighbor port has been recently attached in the network representation. The step of processing may include processing the at least one pseudo new neighbor report following a predetermined amount of time after the second report was received.

Another aspect of the invention is directed to an apparatus for tracking a configuration of a plurality of ports of a communications network, comprising means for receiving a report that includes an indication that a reporting port has a connection to a neighbor port, means for determining whether the reporting port has been recently attached to any connection within the communications network, means for determining whether the neighbor port has been recently attached to any connection within the communications network, and means for determining the configuration of the plurality of ports based upon based upon whether the reporting port has been recently attached and whether the neighbor port has been recently attached. The means for determining whether either of the ports has been "recently" attached may include means for determining whether the port has been attached to a connection for a predetermined amount of time prior to receiving the report. The apparatus may also include means for creating a network representation that is a virtual model of the configuration of the communications network.

Another embodiment of the invention is directed to an apparatus for tracking a configuration of a plurality of ports of a communications network. The apparatus comprises a network representation, an event stream filter, a new neighbor report module, and a lost neighbor report module. In this embodiment, the network representation is a virtual model of the configuration of the plurality of ports. The event stream filter receives a plurality of reports from the communications network and provides a first report to the new neighbor report module and a second report to the lost neighbor report module. The first report includes an indication that a reporting port has a connection to a neighbor port, and the second report includes an indication that a second reporting report has lost a connection to a lost neighbor port. The new neighbor report module receives the first report from the event stream filter, and provides a modification of the network representation based upon the first report. Additionally, the lost neighbor report module receives the second report from the event stream filter, and provides a modification of the network representation based upon the second report.

BRIEF DESCRIPTION OF THE DRAWINGS

Other features and advantages of the present invention shall appear from the following description of certain exemplary embodiments, said description being made with reference to the appended drawings, of which.

DETAILED DESCRIPTION

In order to provide a monitoring capability to track connections of a connection-oriented communications network, a representation that provides a virtual (i.e., logical) portrayal of the connections within a network may be developed and maintained. Within this disclosure, the term "link" refers to a model, which may be contained within a representation of a network, of a connection between one port and at least one other port. For example, a link may refer to a connection between a first port and a second port. Such a connection may be a simple connection such as a single wire, or a more complex connection such as an ETHERNET cable and associated local area network protocol layers. Additionally, the connection may include switches or hubs along with local area networks and other devices.

Figure 1:
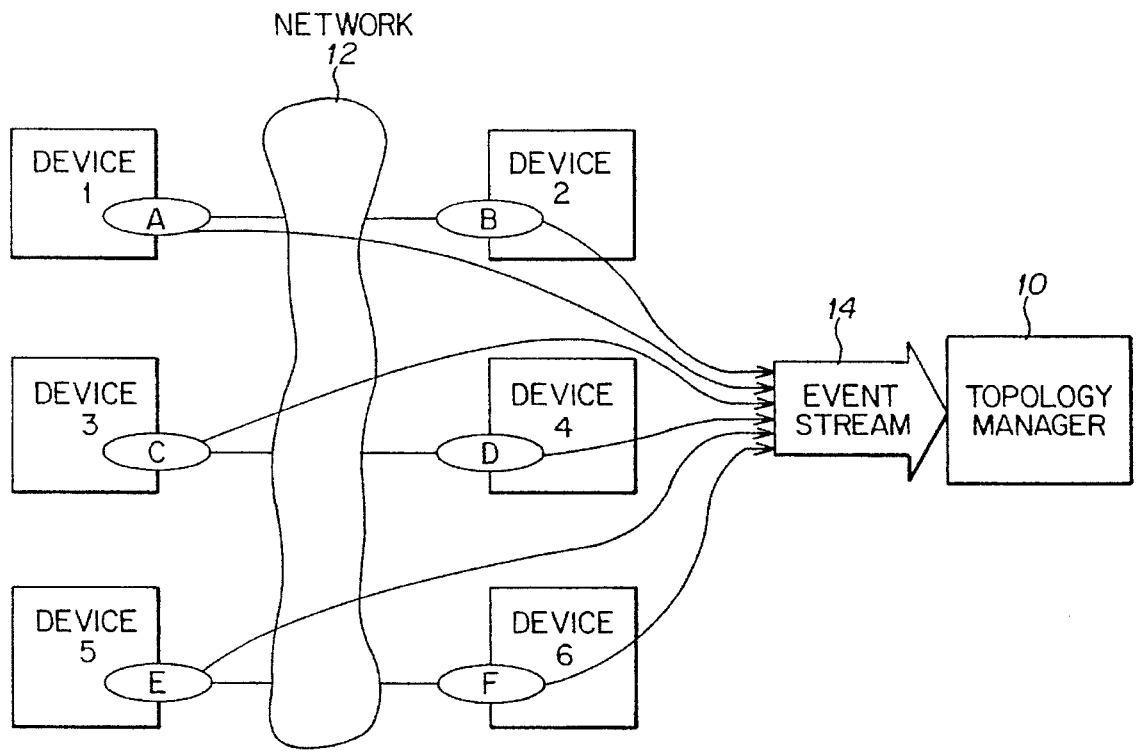
FIG. 1 illustrates a network having connection-oriented communications, which is monitored by a topology manager.

FIG. 1 shows a topology manager 10 which maintains a model of a connection-oriented network, and in particular a model of the current configuration of the elements of the network 12. As shown in FIG. 1, the topology manger 10 receives an event stream 14 from several ports A–F. These ports A–F may be connected via a network 12, which may contain several individual connections among the ports A–F. The event stream 14 includes reports (i.e., messages) which provide information indicative of current and past connections among the ports A–F of the network. In one embodiment of the invention, the reports include a new neighbor report and a lost neighbor report. Each of these reports includes a reporting port and is made with respect to a neighbor port. Typically, these reports are actually generated by a switch or another device which contains the reporting port, or from a source, destination, or other nodes within the network. For the purposes of this disclosure the report may be considered as being generated by the reporting port itself, so that the phrase "port A generates a report" actually means "a device on the network provides a report with port A included as the reporting port."

A new neighbor report is an indication that the reporting port has been connected to the neighbor port. The expression "X->Y" represents a new neighbor report from reporting port X with respect to new neighbor Y. A lost neighbor report is an indication that a particular connection that once existed has been lost between the reporting port and the neighbor port. The expression "X<-Y" represents a lost neighbor report from reporting port X with respect to lost neighbor Y. Another type of report is a lost all neighbors report, which is indicative that a reporting port has been disconnected from all other ports. For the purposes of this disclosure, a lost all neighbors report may be considered as a plurality of individual lost neighbor reports. It is not necessary to have reports of exactly these types, as long as some information indicative of a change or a current status of the port connections is provided.

One approach to monitoring the topology of a network is to maintain a representation of the network and update the representation as reports, such as new neighbor reports and lost neighbor reports, are received. For example, if a topology manager 10 receives a new neighbor report of a reporting port with respect to a new neighbor port, then in the representation of the network, a model of the reporting port may be disconnected from any link to which the reporting port is attached, and then the model of the reporting port may be connected to a model of the new neighbor port, to form a link between the two models. Additionally, if a lost neighbor report is received from a reporting port with respect to a neighbor port, and a model of the reporting port and a model of the neighbor port both exist within the representation of the network, then the model of the neighbor port may be disconnected from the model of the reporting port.

Figure 2:
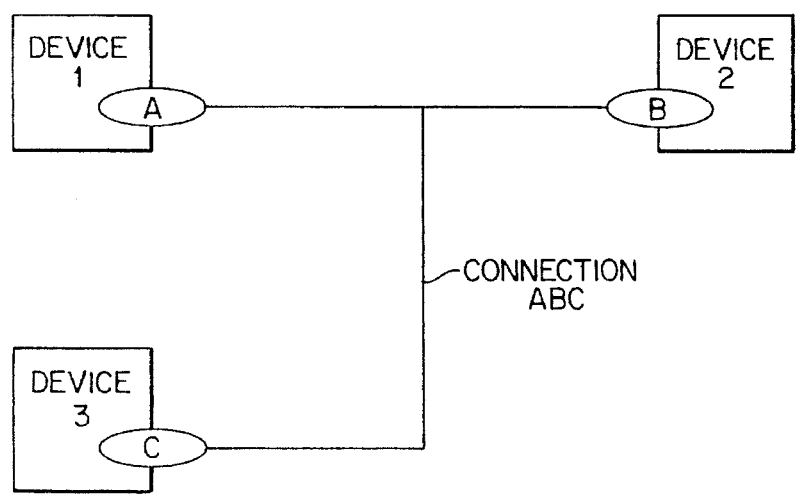
FIG. 2 illustrates an example of a connection among three ports.

However, this approach does not effectively support connections among more than two ports. For example, as shown in FIG. 2, a connection ABC may be a connection between port A of device 1, port B of device 2, and port C of device 3. The connection ABC may be referred to as an interswitch connection. If device C is removed from link ABC, a total of four lost neighbor reports would be received by the topology manager 10. In particular, the event stream may include the following reports: A<–C, B<–C, C<–A, and C<–B. However, due to situations such as delays in the generation and transmission of reports, for example by device 1, device 2, and device 3, the reports may be received in any order by the topology manager 10. The delay in generating and transmitting reports may be due to communication or processing delays, or due to a situation in which the network 12 is being reconfigured in response to other reconfigurations.

In the approach described above, the topology manager 10 would contain a representation of the connection among port A, port B, and port C, as a link ABC including a model of port A, a model of port B, and a model of port C. If the report C<–A is received first, then the topology manager would disconnect the model of port A from the model of link ABC, because port C is reporting port A as a lost neighbor. At this point, the representation of the network would indicate that link ABC includes port B and port C. This is an incorrect result, and exemplifies why the approach described above does not support links of more than two ports.

An embodiment of the invention is directed to a method and apparatus for tracking a configuration of a plurality of ports of a network, in which a representation of the network is created and maintained based upon an attachment time of the relevant ports. As such, an event report may be processed based upon both the current time, for example the time that the report was received by a topology manager, and the time that the relevant ports last changed status, for example the time at which most recent attachment of one of the relevant ports was attached to a link within a representation of a network.

Figure 3:
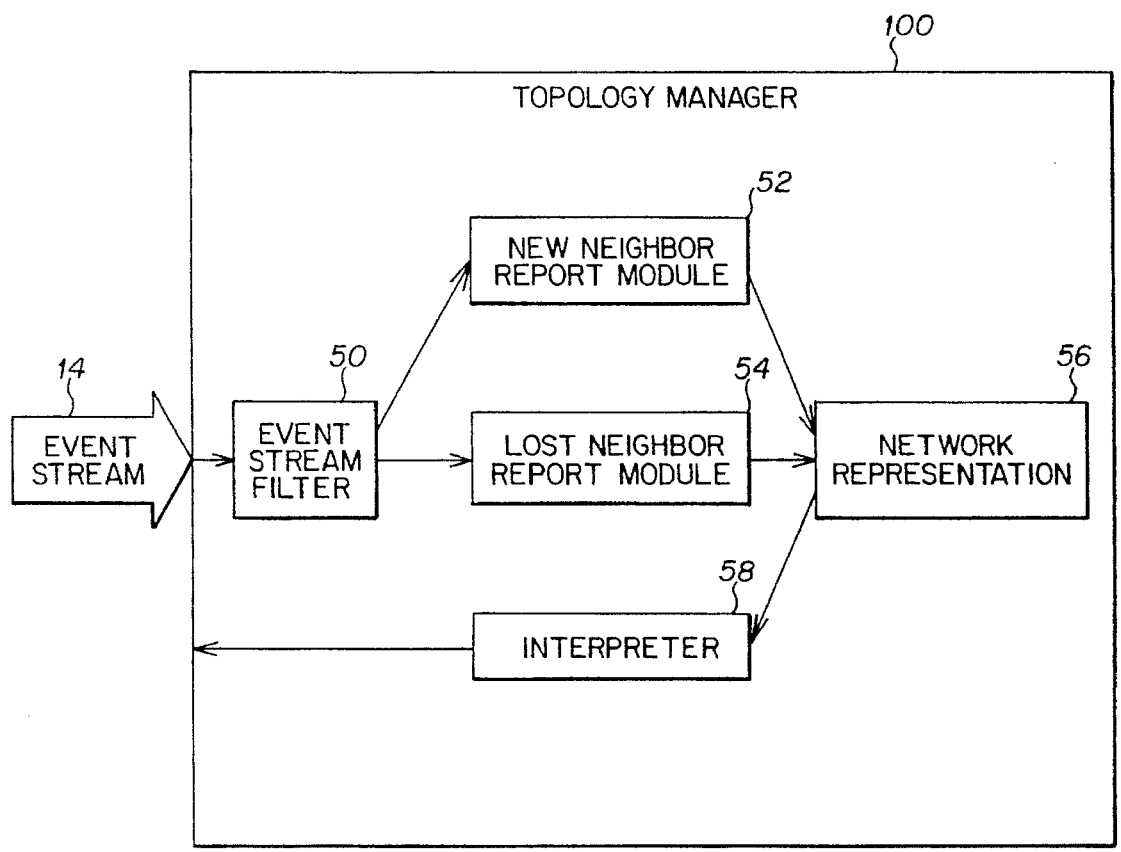
FIG. 3 shows an embodiment a topology manager in accordance with an embodiment of the invention.

FIG. 3 illustrates an embodiment of the invention, which is directed to a topology manager 100 that includes a new neighbor report module 52 and a lost neighbor report module 54, both of which act upon a network representation 56. The topology manager 100 may reside within a device that is connected to the network 12, for example a computer workstation that operates as the central authority for controlling the connections of the network 12. An event stream filter 50 within the topology manager 100 receives reports from an event stream 14, and forwards appropriate reports to the new neighbor report module 52 and the lost neighbor report module 54. An interpreter 58 accesses data within the network representation 56 in order to provide information regarding the current connection status of the network 12 from which the event stream was received.

The network representation 56 may be implemented as a software module, for example an object-oriented software module. An object representation for a connection called "X" that includes ports A, B, and C, could be represented as "link X.ports=[A,B,C]. In object-oriented terminology, this would mean that X is an instantiation of a class called links, and contains individual objects A, B, and C. Such an approach may be useful for maintaining relationships between the ports of a network, as well as maintaining attributes of the ports.

Additionally, in one embodiment, the new neighbor report module 52 and the lost neighbor report module 54 are implemented as software which controls a computer, for example a general purpose computer such as a workstation, a mainframe or a personal computer, to perform steps of the disclosed processes. Such a general purpose computer may be connected to the network in order to receive reports, and may provide commands to devices on the network in order to control the network configuration.

Alternatively, the new neighbor report module 52 and the lost neighbor report module 54 may be implemented as special purpose electronic hardware. Additionally, in either a hardware or software embodiment, the functions performed by the different elements within the topology manager 100 may be combined in different arrangements. For example, the new neighbor report module 52 may be combined with the lost neighbor report module 54 and be implemented as a single hardware or software module.

Within the network representation 56, the model of each port on each device of the network has an associated time stamp field, referred to as attach time $T_{attach}$. For example, each port may be assigned an attach time ($T_{attach}$), indicative of the time at which the model of that port was attached to a current link within the network representation. From a current time ($T_{current}$), which may be, for example, a time at which the topology manager 100 has received a new neighbor or lost neighbor report, each port may be classified as either recently attached (RA) or not recently attached (NRA) based upon a comparison with a predetermined constant value V, as indicated in equations (1) and (2) below:

$$NRA: T_{current} - T_{attach} \geq V \qquad (1)$$

$$RA: T_{current} - T_{attach} < V \qquad (2)$$

In the network representation 56, for example, each time a model of a port is attached to a model of a link, the port is assigned an attachment time $T_{attach}$. At any time, the topology manager 100 may compare time $T_{current}$ to time $T_{attach}$ to determine whether the port is to be classified as RA or NRA with respect to time $T_{current}$. In one embodiment, a constant value V of 90 seconds is used, which allows for reception of the reports associated with a topology change. Alternatively, a different value for V could be used depending upon the number of switches in a network, or on other network characteristics.

Figure 4:
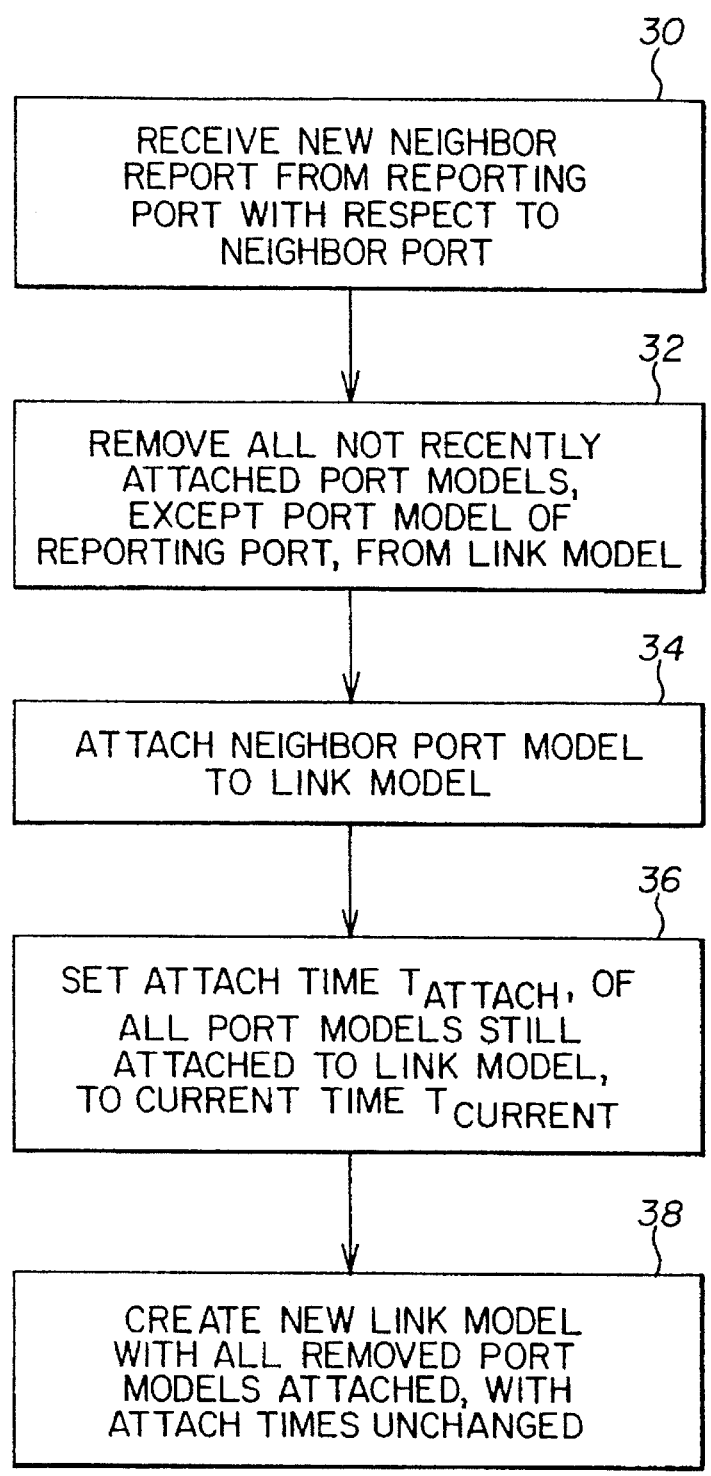
FIG. 4 is a flow diagram of a process performed by a topology manager in order to attach a model of a port to a link within a network representation.

FIG. 4 shows a process performed by the topology manager 100 when a model of a port is to be attached to a model of a link within the representation of a network. Such a process may be performed in response to a step 30 of receiving a new neighbor report from a reporting port. In step 32, all not recently attached (NRA) port models are removed from the link model to which the reporting port is currently attached, except for the port model of the reporting port. As part of step 32, the attach time $T_{attach}$ of each port model attached to the link model may be compared with current time $T_{current}$ to determine whether each of the port models is NRA.

In step 34, the neighbor port model, that was reported in step 30, is attached to the link model. In step 36, the attach time $T_{attach}$ of each of the port models still attached to the link model following step 32, is set to the current time $T_{current}$. In step 38, a new link model is created that has attached to it all of the port models removed in step 32. Step 38 is analogous to making an assumption that the removed ports are part of another connection. The attach time $T_{attach}$ of each to the port models removed in step 32 remains unchanged.

Figure 5A:
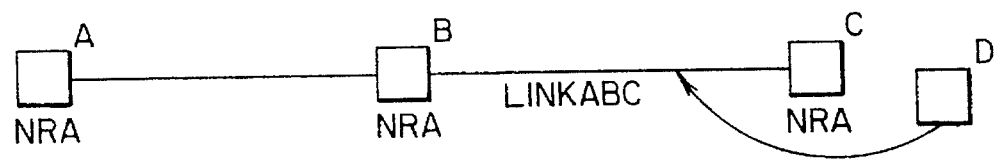
FIGS. 5a, 5b, 5c, and 5d illustrate a network representation which changes as a model of a port is attached to a link which represents a connection within the network.

The following example demonstrates the attachment process of FIG. 4. FIG. 5a is a graphic showing a model of link ABC including a model of port A, a model of port B, and a model of port C, each of which is NRA. The illustrated model of link ABC is exemplary of a model built in response to previously received new neighbor and lost neighbor reports. A model of port D is to be attached to the model of link ABC, which would typically be in response to the actual port D being connected to the connection among port A, port B, and port C. The connection of port D would result in a report B->D being sent to the topology manager, indicating that reporting port B is aware of new neighbor port D. The topology manager 100, in response to this new neighbor report, may modify the model of link ABC accordingly.

Figure 5B:

In accordance with step 32, all not recently attached port models on the link of port B (link ABC) are removed from the link model, except for the port model of the reporting port. Thus, in the example illustrated in FIG. 5a, since port A and port C are both NRA, both corresponding models are removed from link ABC. Since port B is the reporting port, even though port B is NRA the port B model is not removed from link ABC. The resulting configuration is shown in FIG. 5b.

Figure 5C:
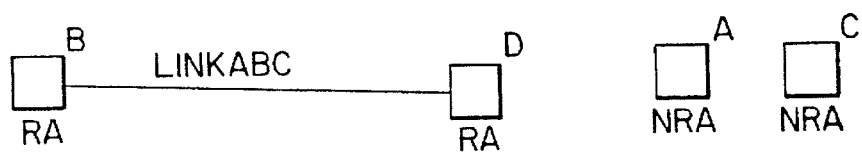

Following step 34, the model of port D is attached to link ABC, because port D is the neighbor port reported in the report B->D. As indicated in step 36, the attach time $T_{attach}$ of all port models still attached to the link model are set by the topology manager 100 to be equal to the current time $T_{current}$, so that both the port B model and the port D model are considered RA, as shown in FIG. 5c.

Figure 5D:
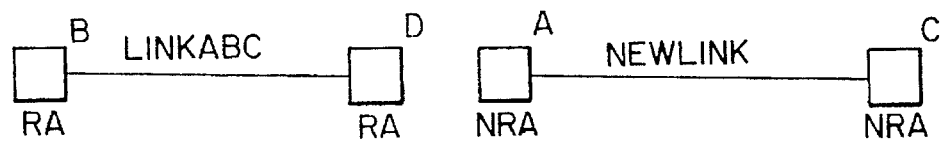

Following step 38, a new link model ("newlink") is created as shown in FIG. 5d, which includes all removed port models attached (models of port A and port C), with attach times unchanged. Because the attach times of port A and port C are unchanged, both port A and port C are still considered NRA, as shown in FIG. 5d, which shows an arrangement at the conclusion of the attachment process. Typically, reports in addition to the B->D report discussed above would be received, resulting in an accurate model, within the topology manager 100, of the connections within the network 12.

Figure 6:
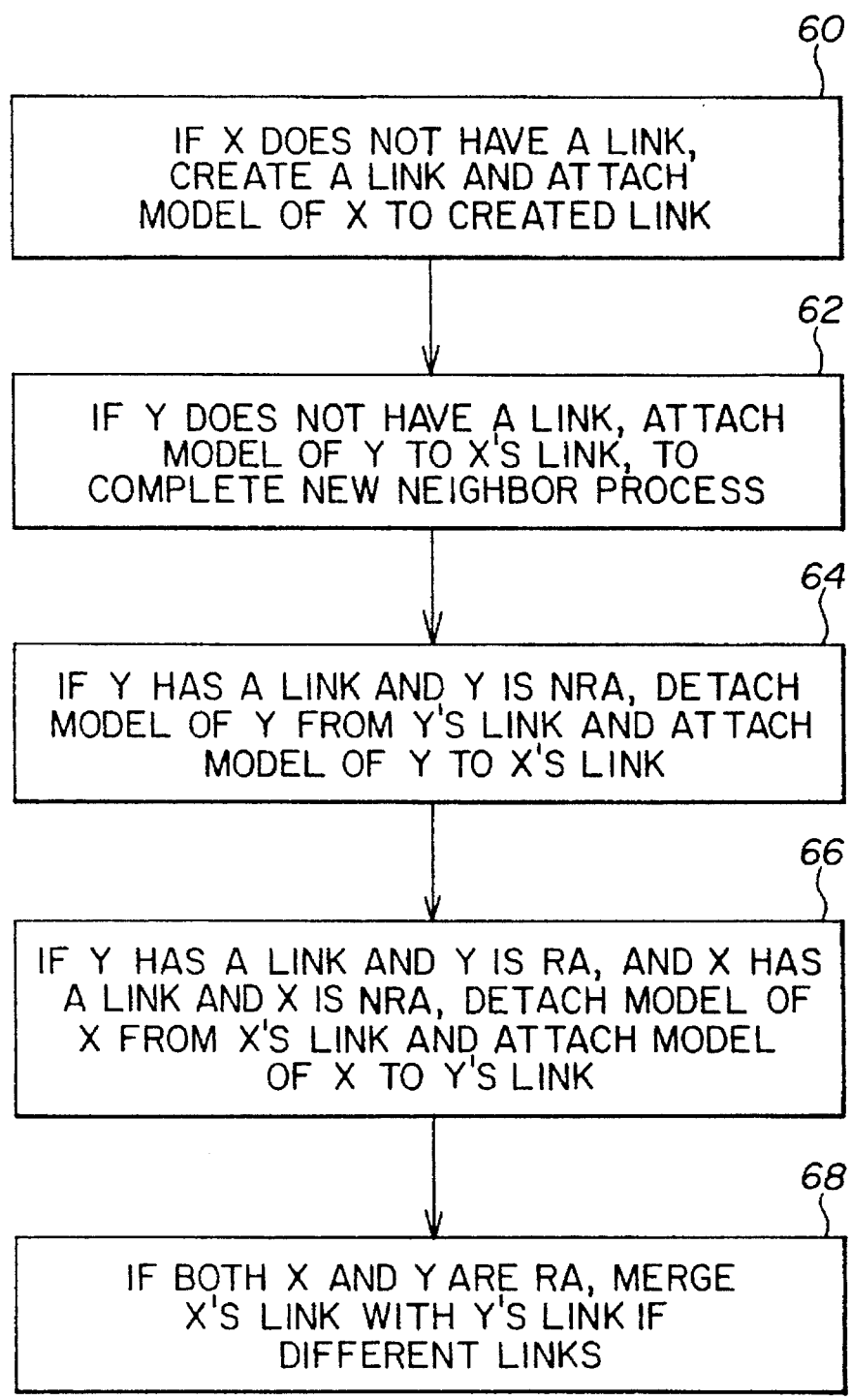
FIG. 6 is a flow diagram of a process performed by a topology manager, in response to the receipt of a new neighbor report from the network.

An embodiment of a new neighbor process, performed by the new neighbor module 52, is shown in the flowgraph of FIG. 6. This process is invoked in response to the topology manager receiving a report of X->Y (port X reports new neighbor Y). As shown in step 60, if port X does not have a link within the network representation 56, a link is created and the model of port X is attached to the created link. In step 62, if port Y is not currently attached to any link, then the model of port Y is attached to X's link, and the new neighbor process is completed for the X->Y report. In step 62, the model of port Y is attached to X's link regardless of whether X's link is RA, NRA, or recently created in step 60.

As shown in step 64, if port Y has a link and is NRA, then the model of port Y is detached from Y's link and the model of Y is attached to X's link, regardless of whether port X is NRA or RA. As shown in step 66, if port Y has a link and is RA and port X has a link and is NRA, then the model of port X is detached from X's link and attached to Y's link. In step 68, if ports X and Y are both RA, then X's link and Y's link are merged if X's link is different from Y's link. Merging, in this context, refers to the process of detaching all RA ports on one link and attaching them to the other link. If X and Y are both RA and share a common link, then no action would be taken.

Table 1 is a truth table for the actions performed as a result of a report of X->Y, and shows similar results as those illustrated in FIG. 6.

As a result of the new neighbor process as described above and shown in FIG. 6, the order in which reports are received by a topology manager 100 will not adversely affect the network representation 56, and connections among more than two ports may be effectively tracked.

TABLE 1

|  | Y HAS NO LINK | Y HAS LINK (Y'S LINK), Y IS NRA | Y HAS LINK (Y'S LINK), Y IS RA |
| --- | --- | --- | --- |
| X HAS NO LINK | CREATE NEW LINK WITH X ATTACHED, ATTACH Y TO NEW LINK | CREATE NEW LINK WITH X ATTACHED, DETACH Y FROM Y'S LINK, ATTACH Y TO X'S LINK | CREATE NEW LINK WITH X ATTACHED |
| X HAS LINK (X'S LINK), X IS NRA | ATTACH Y TO X'S LINK | DETACH Y FROM Y'S LINK, ATTACH Y TO X'S LINK | DETACH X FROM X'S LINK, ATTACH X TO Y'S LINK |
| X HAS LINK (X'S LINK), X IS RA | ATTACH Y TO X'S LINK | DETACH Y FROM Y'S LINK, ATTACH Y TO X'S LINK | MERGE X'S LINK WITH Y'S LINK IF DIFFERENT |

An example of the performance of the new neighbor process is depicted with respect to a topology as shown in FIGS. 7a–7d. In the original topology shown, shown in FIG. 7a, a connection represented by link ABC includes port A, port B, and port C. In this example, there has not been any recent activity with respect to ports A–C, so each of ports A–C are labeled NRA. As described above with respect to equations (1) and (2), the topology manager 100 may determine the difference between the attach time $T_{attach}$ of each of the ports A–C with respect to the current time $T_{current}$ to determine whether each port is RA or NRA.

Figure 7A:
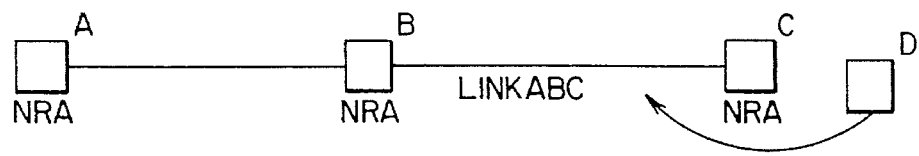
FIGS. 7a, 7b, 7c, 7d, and 7e illustrate a network representation which changes in response to reports received from the network indicating that a port has been attached to an existing connection.

As shown in FIG. 7a, a port D has been added to the connection represented by link ABC. Accordingly, the network representation 56 will be updated on the basis of reports received within the event stream 14. Several reports will likely be received by the topology manager 100. For example, report A–>D will be generated by port A, because port A now senses port D as a new neighbor. Similarly, report B–>D will be generated by port B, and report C–>D will be generated by port C. Also, port D will generate reports D–>A, D–>B, and D–>C, because port D now senses ports A, B, and C.

Figure 7B:
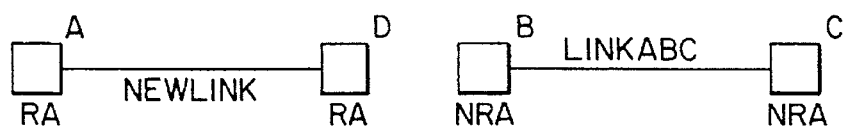
Figure 7C:
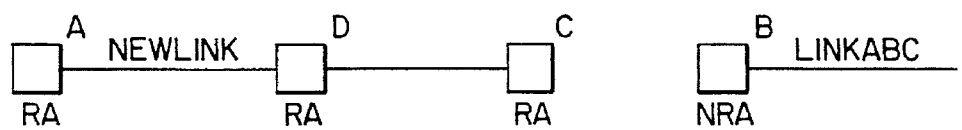

Report D–>A may be the first report received by the topology manager 100 relating to the addition of port D to the connection of ports A–C. In such an instance, in accordance with step 60 of FIG. 6, a new link "newlink" is created, and the model of port D is attached to the created link. In accordance with step 64, because A has link ABC and A is NRA, the model of port A is detached from A's link (link ABC) and attached to X's link (link "newlink"). This results in the configuration as shown in FIG. 7b. Note that in accordance with the attachment process of FIG. 3, the $T_{attach}$ of each of port A and port D is updated to reflect the time at which the attachment was made in the network representation. Assuming that less time has passed than the time represented by the constant V, then as shown in FIG. 7b both port A and port D are labeled RA. However, as depicted in step 38 of FIG. 3, the $T_{attach}$ of each of port B and port C are unchanged, so both port B and port C remain NRA.

If report C–>D is the next report received by the topology manager 100, following report D–>A, then step 66 would be followed, because port D has a link, port D is RA, port C has a link, and C is NRA. Accordingly, the model of port C is detached from C's link (link ABC), and the model of port C is attached to Y's link (link "newlink"), resulting in the configuration shown in FIG. 7c. Note that port C is now considered RA due to the recent attachment of C to link "newlink." At this point, if either report A–>C or report D–>C are received, since each of ports A, C, and D are RA, no action would be taken.

Figure 7D:

If report B–>D is the next report received by the topology manager 100 following report C–>D, then in accordance with step 66, the model of port B is detached from link ABC and attached to the link "newlink." The result of this action is depicted in FIG. 7d, which illustrates the proper result in which all four ports A–D are on one common connection.

Figure 7E:
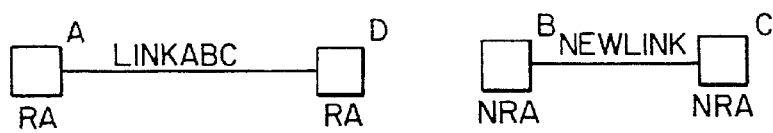

An advantage of the new neighbor process of FIG. 6 is that the order in which the relevant reports is received is not critical. For example, for the topology shown in FIG. 7a, the report A–>D may be the first report received by the topology manager 100. In such an instance, in accordance with step 62, the model of port D is attached to link ABC, and the attach times of both port A and port D are updated to $T_{current}$, so both ports are RA. Additionally, because the attach process is followed, in particular steps 32 and 38, the model of port B and the model of port C are both attached to a new link "newlink," and both remain NRA. Such a situation is shown in FIG. 7e.

At this point, if the next report received is D–>A, there will be no change in the network representation. Additionally, if either of the reports D–>B or B–>D is the next to be received, then the model of port B will be detached from link "newlink" and attached to link ABC, with an updated $T_{attach}$. Similarly, if either of the reports C–>D or D–>C is the next to be received, then the model of port C will be detached from link "newlink" and attached to link ABC, with an updated $T_{attach}$. As discussed earlier, it is an advantage of an embodiment of the invention that the network representation 56 may be maintained in a manner which does not depend upon the order in which the reports are received.

Figure 8A:
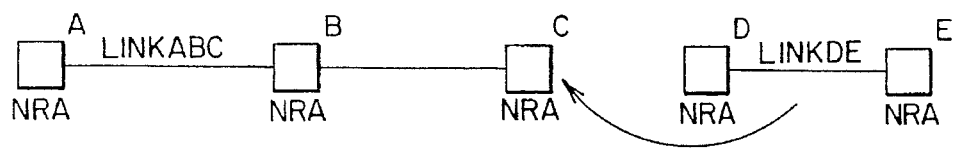
FIGS. 8a, 8b, 8c, 8d, and 8e illustrate a network representation which changes in response to reports received from the network indicating that a port has been detached from one existing connection and attached to another existing connection.

Another example of a topology change will illustrate the merging of two links, which occurs when it is determined that two connections have been formed into a single connection. For example, as shown in FIG. 8a, there exists a connection among ports A–C, and a connection between ports D–E. Accordingly, the network representation 56 contains a link ABC including models of ports A–C, and a link DE including models of ports D–E. In this example, there have been no recent changes to the topology, so all ports are NRA.

Figure 8B:
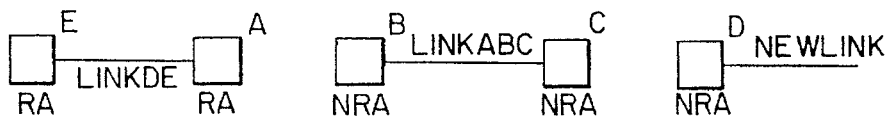
Figure 8C:
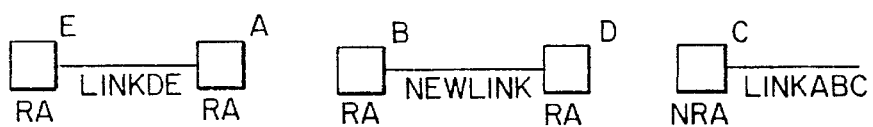
Figure 8D:
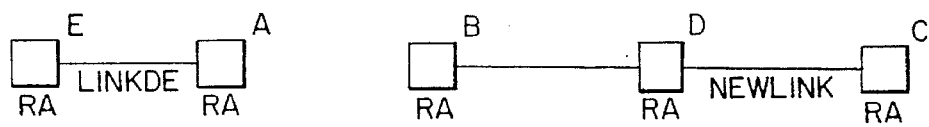
Figure 8E:
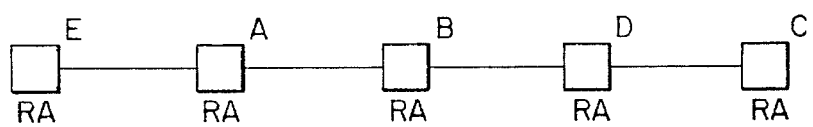

Any one of several reports could be received first by the topology manager 100. Assuming, for example, that report E–>A is received first, then as a result of step 64 and the attachment process of FIG. 3, a new link "link DE" is created to which the models of ports E and A are attached. Additionally, the models of ports B and C are in a separate link ABC, with NRA status unchanged. Additionally, because the model of port D was detached from link DE, link E is in its own link "newlink." This arrangement is shown in FIG. 8b. If the next received report is report D–>B, step 64 and the attachment process of FIG. 3 would cause the model of port B to be added to D's link "newlink," and both port B and port D would be updated to RA status, as shown in FIG. 8c. FIG. 8d illustrates the result if report C–>D is the next report to be received. In particular, C has been added to the link "newlink" and updated to RA status. At this point, if any port from the connection represented by link DE becomes aware of any port from the connection represented by link "newlink," then the links will be merged. For example, if the next report received is D–>A, then the final configuration will be as illustrated in FIG. 8e. Any additional reports received will not alter this final configuration.

Figure 9A:
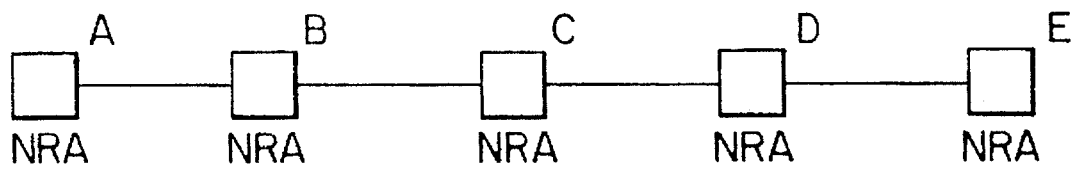
FIGS. 9a and 9b illustrate a topology of a network representation in which a single connection has been split into two other connections.
Figure 9B:

An embodiment of the lost neighbor process also uses a time stamp with respect to a port, and allows representation of connections which are split into two or more connections. The conventional topology manager 10 is generally ineffective in handling the splitting of a connection. For example, FIG. 9a shows a connection having ports A–E, all of which are NRA. If this connection is split into a first connection including ports A–B and a second connection including ports C–E, such as shown in FIG. 9b, the possible reports would include A–<C, A–<D, A–<E, B–<C, B–<D, B–<E, C–<A, C–<B, D–<A, D–<B, E–<A, and E–<B. If the first report received is A–<C, for example, the model of port C would be removed from the link representing the connection. If the report A–<D follows, the model of port D would be removed from the link representing the connection. At this point, there is no indication that port C and port D are physically on the same connection, because no new neighbor reports will be generated with respect to ports C and D, because they have been neighbor ports all along. Therefore, ports C and D would have remained detached from each other in a network representation in the conventional art. Other examples of this drawback may be observed with other orders in which the reports may be received.

Figure 10:
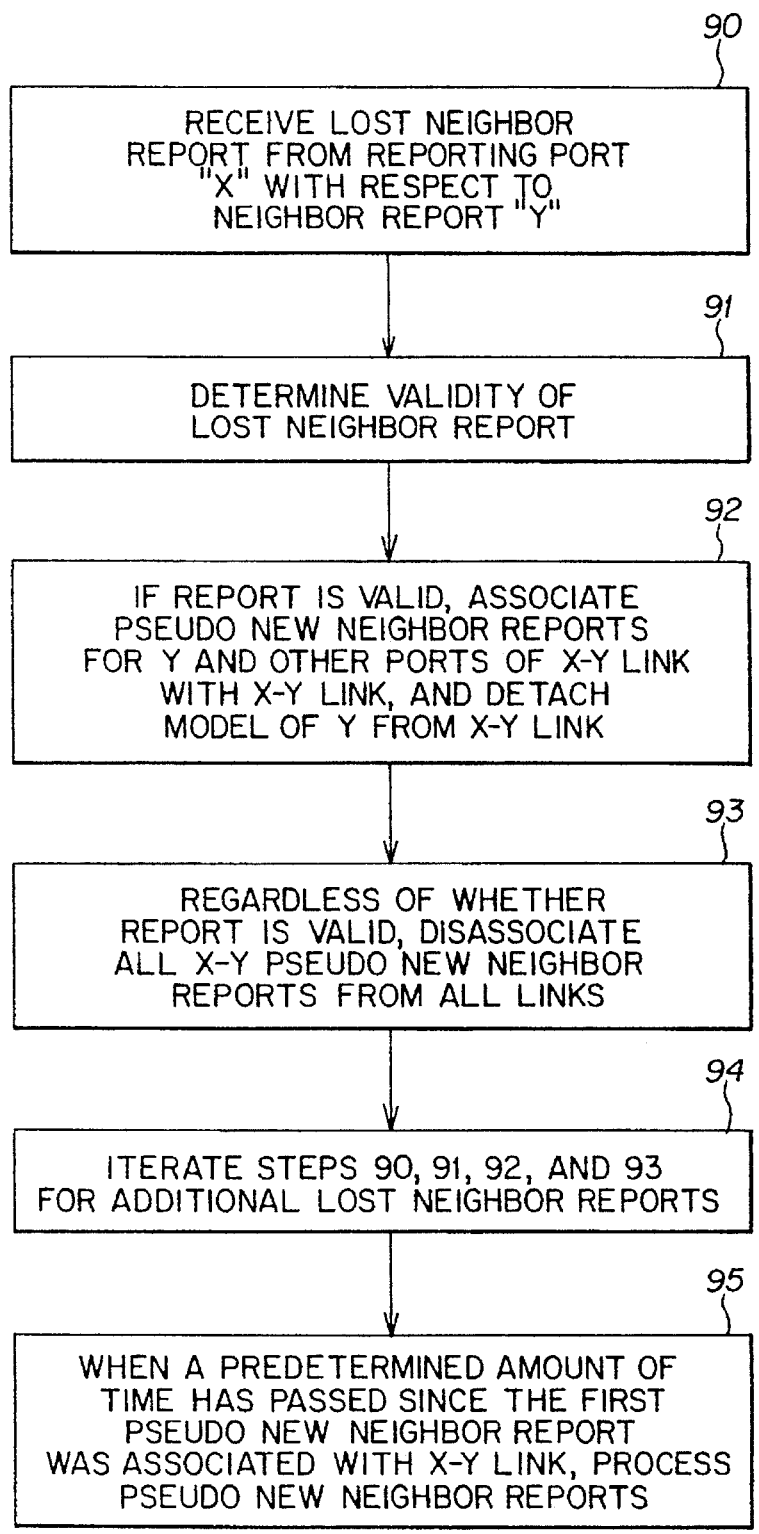
FIG. 10 is a flow diagram of a process performed by a topology manager in response to the receipt of a lost neighbor report from the network.

An embodiment of the lost neighbor process, typically performed by the lost neighbor module 54, is illustrated in FIG. 10. According to this embodiment, reports called pseudo new neighbor reports (PNNs) are generated and associated with a link representing a connection for which a lost neighbor report has been received. Depending upon the reports received, some of these PNNs may be disassociated with the link. When a certain time period has passed, which is typically indicative that the transition from one topology to another topology has been completed, the PNNs are processed as if they were normal new neighbor reports, as described above with respect to the new neighbor process.

As shown in FIG. 10, in step 90 a lost neighbor report is received, report X–<Y, which is indicative of reporting port X reporting that neighbor port Y has been lost. In step 91, the validity of the lost neighbor report is determined. In one embodiment, step 91 involves determining whether the models of port X and port Y currently share a same link, and whether the model of port Y is recently attached. In particular, if the models of port X and port Y do not currently share a same link, then it is possible that the report X–<Y is erroneous. Therefore, the report may be deemed invalid. Additionally, if the model of port Y is classified RA, then it is possible that the report X–<Y may be left over from an earlier detachment of Y, so the report may be deemed invalid.

In step 92, if the report has been deemed valid, PNNs for port Y with respect to the other ports of the X–Y link are generated, and the model of Y is detached from the X–Y link model. In essence, the PNNs represent the assumption that other ports of the X–Y connection have not yet been disconnected, pending further information to be received from the network. In step 93, regardless of whether the report was deemed valid in step 91, all X–Y PNNs in all links in the network representation 56 are disassociated. In step 94, steps 90–93 are further iterated in response to other lost neighbor reports. Additionally, during step 94, other new neighbor reports may be processed in accordance with the new neighbor process.

Step 95 is performed when a predetermined amount of time has passed since the first PNN of the X–Y link was associated with the X–Y link. This predetermined amount of time may be based upon the amount of activity expected for a particular network. In step 95, all of the PNNs for the X–Y link are processed as new neighbor reports. Thus, the PNNs for ports which were not detached are treated as new neighbor reports, and will result in the appropriate port models being reattached to the appropriate links.

Figure 11A:
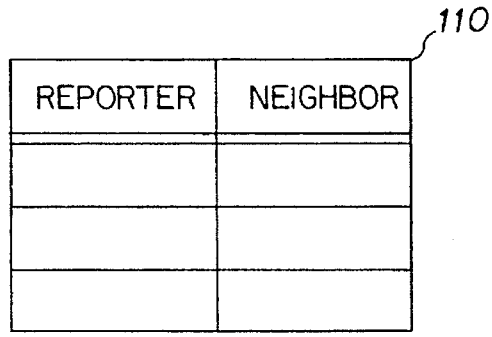
FIGS. 11a, 11b, and 11c illustrate a pseudo new neighbor table which is associated with a link within a network representation, and used in conjunction with the process of FIG. 10.
Figure 11B:
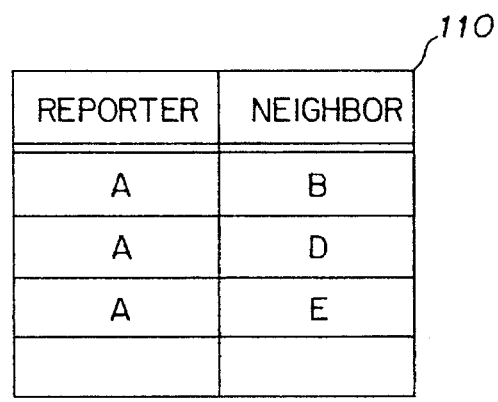

In one embodiment, the PNNs may be contained within a table that is associated with a particular link. For example, FIG. 11a shows a PNN table 110; associated with the link shown in FIG. 9a, prior to any lost neighbor reports being received. If the connection represented by the link in FIG. 9a were split into the two connections represented by the links shown in FIG. 9b, then the reports described above with respect to FIG. 9b would be generated. If the first report to be received is C–<A, then the process of FIG. 10 would be followed. In particular, step 92 indicates that PNNs would be generated for port A and each of the other ports of link ABCDE other than port C, and these PNNs would be associated with link ABCDE. Accordingly, PNN reports A–<B, A–<D, and A–<E are generated and provided in the PNN table associated with link ABCDE, as shown in FIG. 11b.

At this point, a timer may also be initiated so that in the future it may be determined whether a predetermined amount of time has passed, as shown in step 95. When the timer reaches a value equal to the predetermined amount of time Tpnn, then the table may be "flushed," so that all PNNs within the table are processed as if they were normal new neighbor reports.

In accordance with step 93, any other A–<C and C–<A PNNs are removed from any other PNN tables which may exist within the network representation.

Figure 11C:
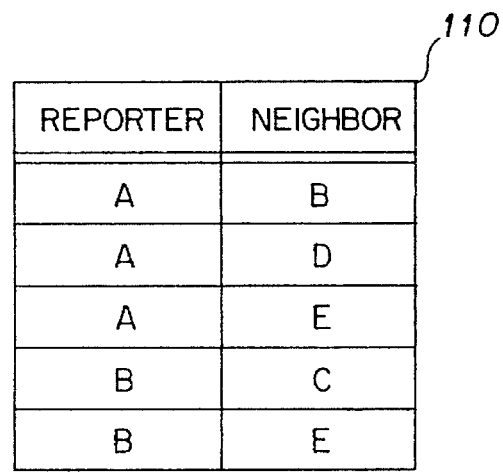

If the next report received is report D–<B, then PNNs for port B with respect to the other reports remaining on the link ABCDE would be generated and entered into the PNN table. Since the model of port A was already removed, no PNNs are generated with respect to port A. However, because port C and port E were still attached to link ABCDE at the time that the report D–<B was received, PNNs for B–>C and B–>E will be entered into the PNN table, as shown in FIG. 11c. Additionally, the model of port B is detached from link ABCDE (step 92), and any PNN reports for B–>D and D–>B would be removed from other PNN tables of other links.

As shown in step 94, the process is iterated for additional lost neighbor reports until the predetermined amount of time has passed, indicated for example by the timer reaching the value Tpnn. When a predetermined amount of time has passed, since the first pseudo new neighbor report was associated with the link X–Y, as shown in step 95, then the pseudo new neighbor reports are processed as though they were actual new neighbor reports.

Figure 12A:
FIGS. 12a, 12b, 12d, and 12e illustrate a network representation which changes in response to both new neighbor reports and lost neighbor reports.
Figure 12B:
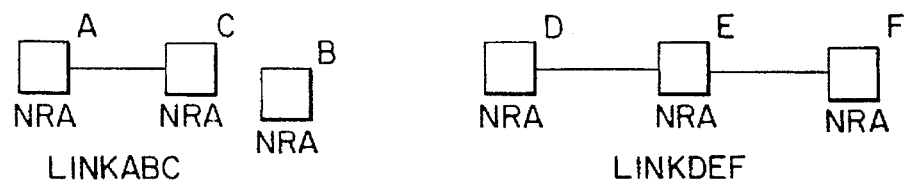

FIGS. 12a–12e illustrate an example of the new neighbor report module 52 operating in conjunction with the last neighbor report module 54. As shown in FIG. 12a, there exists in this example a connection of ports A, B, and C, each of which is NRA. This connection is represented as link ABC. There is also another connection, represented as link DEF, that includes ports D, E, and F, each of which is NRA. Within the network, port A is disconnected from the connection with ports B and C, and connected to the connection represented by link DEF. This would not be a complicated situation if all of the new neighbor reports were guaranteed to arrive prior to the arrival of the lost neighbor reports. However, the new neighbor report module 52 and lost neighbor report module 54 operate effectively even in the presence of different arrival orders.

Figure 12C:
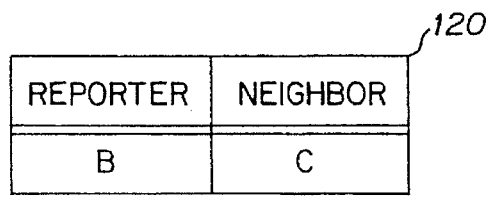
FIG. 12c shows the content of a pseudo new neighbor table in conjunction with the network representations of FIGS. 12a, 12b, 12d, and 12e.

The following reports would be generated in such an instance: A–<B, A–<C, A–<D, E–>A, F–>A, B–<A, A–>E, D–>A, A–>F, and C–<A. For the purposes of this example, this arrival order will be illustrated. The first event is a lost neighbor event, A–<B. In the network representation 56, A's link and B's link are the same, and both are NRA, so in accordance with step 91 this report is considered valid. Accordingly, the model of port B is detached from link ABC, resulting in the arrangement illustrated in FIG. 12b. Also, appropriate entries are added to the PNN table 120 for link ABC, as shown in FIG. 12c.

In the order given above, the next report to arrive is report A–<C. Both port A and port C share a same link, and both are NRA, so the model of port C is detached in accordance with step 92 of the lost neighbor process. No entries are added to the PNN table 120 for link ABC, because there are no other ports of the relevant link.

Figure 12D:
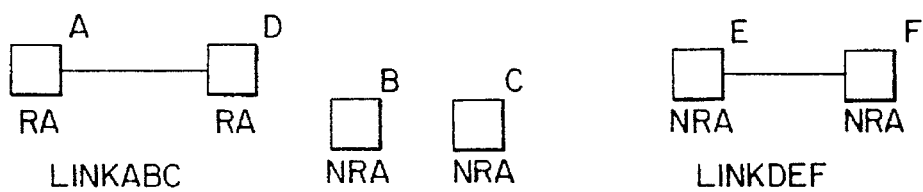

When report A–>D arrives, the model of port D is removed from link DEF, and is attached to link ABC, which at this time has only the model of port A attached. This results in the topology as shown in FIG. 12d, and the PNN table 120 for link ABC remains the same.

The next two reports received in this example are report E–>A and report F–>A. These reports will cause the models of ports E and F to be detached and attached to link ABC. Note that if link DEF had a PNN list, then link DEF would not be removed from the network representation 56 until the associated timer had expired and the pseudo new neighbor reports were generated and processed.

After the attachments of the models of ports E and F to link ABC, the remainder of the reports do not cause any changes, and may be considered redundant. In particular, the remaining lost neighbor reports are not valid, because the ports involved are not on the same link anymore. Additionally, the remaining new neighbor reports are redundant because the models of ports A, D, E, and F are all on the same link ABC already.

Figure 12E:
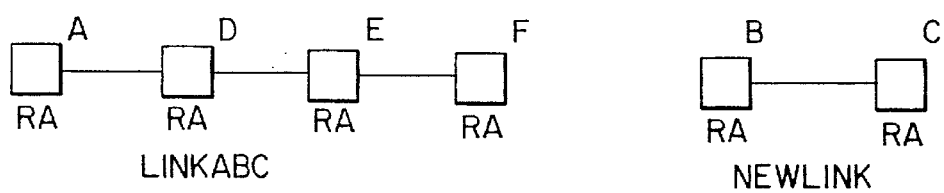

When the timer associated with link ABC reaches Tpnn, the pseudo new\neighbor report B–>C will be processed, resulting in the models of ports B and C to be linked together, resulting in the topology as shown in FIG. 12e.

With respect to the embodiments described above, a topology manager allows network reports to be processed independent of the order in which the reports are received, and also facilitates monitoring of complex network topologies, such as those including connections of more than two nodes, and those in which reports may be received in any order.

Having thus described several embodiments of the invention, various alterations, modifications, and improvements will readily occur to those skilled in the art. Such alterations, modifications, and improvements are intended to be within the spirit and scope of the invention. For example, the network representation 56 may be maintained as a conventional database structure or with special purpose software, instead of as an object-oriented structure. Accordingly, the foregoing description is by way of example only, and not intended to be limiting. The invention is limited only as defined in the following claims and the equivalents thereto.

What is claimed is:

1. A method for tracking a configuration of a plurality of ports of a communications network, comprising the steps of:
   (a) receiving a report that includes an indication that a reporting port has a connection to a neighbor port;
   (b) determining whether the reporting port has been recently attached to any connection within the communications network;
   (c) determining whether the neighbor port has been recently attached to any connection within the communications network; and
   (d) determining the configuration of the plurality of ports based upon whether the reporting port has been recently attached and whether the neighbor port has been recently attached.

2. The method of claim 1, wherein:
   step (b) includes determining whether the reporting port has been attached to a connection for a predetermined amount of time prior to step (a); and
   step (c) includes determining whether the neighbor port has been attached to a connection for a predetermined amount of time prior to step (a).

3. The method of claim 1, wherein step (d) includes creating a network representation that is a virtual model of the configuration of the communications network.

4. The method of claim 3, wherein:
   step (b) includes determining whether a model of the reporting port has been attached to a link within the network representation for a predetermined amount of time, the link representing a connection of the communications network; and
   step (c) includes determining whether a model of the neighbor port has been attached to a link within the network representation within a predetermined amount of time, the link representing a connection of the communications network.

5. The method of claim 4, wherein the step of creating a network representation includes the steps of:
   determining whether the reporting port is attached to any existing link within the network representation;
   when the reporting port is not attached to any existing link, creating a new link and attaching a model of the reporting port to the model of the new link;
   determining whether the neighbor port is attached to any existing link within the network representation; and
   when the neighbor port is not attached to any existing link, attaching a model of the neighbor port to the new link.

6. The method of claim 5, wherein the step of creating a network representation further includes the steps, performed when the neighbor port is not recently attached and the network representation includes a model of an old link to which a model of the neighbor port is attached, of:
   detaching the model of the neighbor port from the old link; and
   attaching the model of the neighbor port to one of the existing link and the new link.

7. The method of claim 6, wherein the step of creating a network representation further includes the steps, performed when the neighbor port is recently attached and the network representation includes an old link to which a model of the neighbor port is attached, of:
   detaching the model of the reporting port from the existing link; and
   attaching the model of the reporting report to the old link.

8. The method of claim 7, wherein the step of creating a network representation further includes the step, performed when the reporting port is recently attached to the existing link and the neighbor port is recently attached to a second existing link, of merging the existing link with the second existing link.

9. The method of claim 1, further comprising the step of:
   receiving a second report that includes an indication that a second reporting port has lost a connection to a lost neighbor port;
   and wherein step (d) includes the steps of:
      creating at least one pseudo new neighbor report; and
      processing the at least one pseudo new neighbor report to determine the configuration of the plurality of ports.

10. The method of claim 9, wherein:
    the lost neighbor port and the second reporting port are connected to a connection that includes other associated ports; and
    the step of creating includes creating a pseudo new neighbor report for each of the other associated ports, the pseudo new neighbor report including the lost neighbor port as a pseudo reporting port and the each of the other associated ports as a pseudo new neighbor port.

11. The method of claim 10, wherein:
    step (d) includes creating a network representation that is a virtual model of the configuration of the communications network; and
    the method further comprises the step of determining the validity of the second report by determining whether a model of the second reporting port and a model of the lost neighbor port currently share a same link within the network representation, and whether the model of the lost neighbor port is recently attached in the network representation.

12. The method of claim 9, wherein the step of processing includes processing the at least one pseudo new neighbor report following a predetermined amount of time from a time at which the second report was received.

13. A method for tracking a configuration of a plurality of ports of a communications network by a system which is capable of processing an actual new neighbor report, the method comprising the steps of:

(a) receiving a report that includes an indication that a reporting port has lost a connection to a lost neighbor port;

(b) creating at least one pseudo new neighbor report; and (c) processing the at least one pseudo new neighbor report as an actual new neighbor report to determine the configuration of the plurality of ports.

14. The method of claim 13, wherein:

the lost neighbor port and the reporting port are connected to a connection that includes other associated ports; and step (b) includes creating a pseudo new neighbor report for each of the other associated ports, the pseudo new neighbor report including the lost neighbor port as a pseudo reporting port and the each of the other associated ports as a pseudo new neighbor port.

15. The method of claim 14, wherein:

step (c) includes creating a network representation that is a virtual model of the configuration of the communications network; and the method further comprises the step of determining the validity of the report by determining whether a model of the reporting port and a model of the lost neighbor port currently share a same link within the network representation, and whether the model of the lost neighbor port is recently attached in the network representation.

16. The method of claim 13, wherein step (c) includes processing the at least one pseudo new neighbor report following a predetermined amount of time frown a time at which the report was received.

17. An apparatus for tracking a configuration of a plurality of ports of a communications network, comprising:

first means for receiving a report that includes an indication that a reporting port has a connection to a neighbor port;

second means for determining whether the reporting port has been recently attached to any connection within the communications network;

third means for determining whether the neighbor port has been recently attached to any connection within the communications network; and fourth means for determining the configuration of the plurality of ports based upon whether the reporting port has been recently attached and whether the neighbor port has been recently attached.

18. The apparatus of claim 17, wherein:

the second means includes means for determining whether the reporting port has been attached to a connection for a predetermined amount of time prior to receiving the report; and the third means includes means for determining whether the neighbor port has been attached to a connection for a predetermined amount of time prior to receiving the report.

19. The apparatus of claim 17, wherein the fourth means includes means for creating a network representation that is a virtual model of the configuration of the communications network.

20. The apparatus of claim 19, wherein:

the second means includes means for determining whether a model of the reporting port has been attached to a link within the network representation for a predetermined amount of time, the link representing a connection of the communications network; and the third means includes means for determining whether a model of the neighbor port has been attached to a link within the network representation for a predetermined amount of time, the link representing a connection of the communications network.

21. The apparatus of claim 17 further comprising:

fifth means for receiving a second report that includes an indication that a second reporting port has lost a connection to a lost neighbor port;

and wherein the fourth means includes:

means for creating at least one pseudo new neighbor report; and means for processing the at least one pseudo new neighbor report to determine the configuration of the plurality of ports.

22. The apparatus of claim 21, wherein:

the lost neighbor port and the second reporting port are connected to a connection that includes other associated ports; and the means for creating includes means for creating a pseudo new neighbor report for each of the other associated ports, the pseudo new neighbor report including the lost neighbor port as a pseudo reporting port and the each of the other associated ports as a pseudo new neighbor port.

23. The apparatus of claim 22, wherein:

the fourth means includes means for creating a network representation that is a virtual model of the configuration of the communications network; and the apparatus further comprises means for determining the validity of the second report by determining whether a model of the second reporting port and a model of the lost neighbor port currently share a same link within the network representation, and whether the model of the lost neighbor port is recently attached in the network representation.

24. The apparatus of claim 21, wherein the means for processing includes means for processing the at least one pseudo new neighbor report following a predetermined amount of time from a time at which the second report was received.

25. An apparatus for tracking a configuration of a plurality of ports of a communications network by a system which is capable of processing an actual new neighbor report, the apparatus comprising:

first means for receiving a report that includes an indication that a reporting port has lost a connection to a lost neighbor port;

second means for creating at least one pseudo new neighbor report; and third means for processing the at least one pseudo new neighbor report as an actual new neighbor report to determine the configuration of the plurality of ports.

26. The apparatus of claim 25, wherein:

the lost neighbor port and the reporting port are connected to a connection that includes other associated ports; and the second means includes means for creating a pseudo new neighbor report for each of the other associated ports, the pseudo new neighbor report including the lost neighbor port as a pseudo reporting port and the each of the other associated ports as a pseudo new neighbor port.

27. The apparatus of claim 26, wherein:

the third means includes means for creating a network representation that is a virtual model of the configuration of the communications network; and the apparatus further comprises means for determining the validity of the report by determining whether a model of the reporting port and a model of the lost neighbor port currently share a same link within the network representation, and whether the model of the lost neighbor port has been recently attached in the network representation.

28. The apparatus of claim 25, wherein the third means includes means for processing the at least one pseudo new neighbor report following a predetermined amount of time from a time at which the report was received.

29. An apparatus for tracking a configuration of a plurality of ports of a communications network, comprising:

a network representation that is a virtual model of the configuration of the plurality of ports;

an event stream filter having an input that receives a plurality of reports from the communications network, and an output that provides a first report that includes an indication that a reporting port has a connection to a neighbor port, and a second report that includes an indication that a second reporting report has lost a connection to a lost neighbor port;

a new neighbor report module, having an input that receives the first report from the output of the event stream filter, and an output that provides a modification of the network representation based upon the first report; and a lost neighbor report module, having an input that receives the second report from the output of the event stream filter, and an output that provides a modification of the network representation based upon the second report.

30. The apparatus of claim 29, wherein the output of the new neighbor report module includes a modification of the network representation based upon whether the reporting port has been recently attached to any connection within the communications network and whether the neighbor port has been recently attached to any connection within the communications network.

31. The apparatus of claim 30, wherein the modification of the network representation is based upon whether a model of the reporting port has been attached to a link within the network representation for a predetermined amount of time, and whether a model of the neighbor port has been attached to a link within the network representation for the predetermined amount of time.

32. The apparatus of claim 29, wherein the output of the lost neighbor module includes at least one pseudo new neighbor report that is processed by the new neighbor report module.

33. The apparatus of claim 32, wherein:

the lost neighbor port and the second reporting port are connected to a connection that includes other associated ports; and the output of the lost neighbor report module includes a pseudo new neighbor report for each of the other associated ports, the pseudo new neighbor report including the lost neighbor port as a pseudo reporting port and the each of the other associated ports as a pseudo new neighbor port.

34. The apparatus of claim 33, wherein the lost neighbor report module includes means for determining the validity of the second report by determining whether a model of the second reporting port and a model of the lost neighbor port currently share a same link within the network representation, and whether the model of the lost neighbor port is recently attached in the network representation.

35. The apparatus of claim 32, further comprising a timer having an output, coupled to the new neighbor report module, for initiating the new neighbor report module to process the at least one pseudo new neighbor report.

* * * * *